United States Patent [19]

Chen et al.

[11] Patent Number: 5,015,390

[45] Date of Patent: May 14, 1991

[54] METHOD FOR CONTROLLING SCALE DEPOSITION IN AQUEOUS SYSTEMS USING QUATERNARY AMMONIUM/MALEIC ANHYDRIDE-TYPE POLYMERS

[75] Inventors: Shih-Ruey T. Chen, Coraopolis; Craig W. Vaughan, Freedom, both of Pa.

[73] Assignee: Calgon Corporation, Pittsburgh, Pa.

[21] Appl. No.: 491,889

[22] Filed: Mar. 12, 1990

Related U.S. Application Data

[63] Continuation of Ser. No. 214,979, Jul. 5, 1988, abandoned.

[51] Int. Cl.$^5$ ............................................. C02F 5/10
[52] U.S. Cl. ..................................... 210/698; 252/180
[58] Field of Search ........................... 210/698–701; 252/180, 181

[56] References Cited

U.S. PATENT DOCUMENTS

| | | | |
|---|---|---|---|
| 4,166,041 | 8/1979 | Goodman | 210/698 |
| 4,253,968 | 3/1981 | Eastman | 210/698 |
| 4,460,477 | 7/1984 | Costello et al. | 210/701 |
| 4,510,059 | 4/1985 | Amjad et al. | 210/701 |
| 4,536,292 | 8/1985 | Matz | 210/701 |
| 4,673,508 | 6/1987 | Coleman et al. | 210/698 |

FOREIGN PATENT DOCUMENTS

2026517 2/1980 United Kingdom ............... 210/701

Primary Examiner—Peter Hruskoci
Attorney, Agent, or Firm—W. C. Mitchell; J. F. DiPrima

[57] ABSTRACT

This invention is directed to a method for controlling the formation of scale deposits in aqueous systems by adding an effective amount, preferably at least 0.1 ppm, of a maleic anhydride/quaternary ammonium-type polymer to the aqueous system being treated.

5 Claims, No Drawings

METHOD FOR CONTROLLING SCALE DEPOSITION IN AQUEOUS SYSTEMS USING QUATERNARY AMMONIUM/MALEIC ANHYDRIDE-TYPE POLYMERS

Tis is a continuation of application Ser. No. 214,979, filed July 5, 1988, now abandoned.

BACKGROUND OF THE INVENTION

U.S. Pat. No. 3,912,693 discloses a photopolymerization method for preparing diallyl quaternary ammonium/maleic acid copolymers.

U.S. Pat. No. 4,640,793 discloses the use of admixtures containing carboxylic acid/sulfonic acid polymers and phosphonates as scale and corrosion inhibitors.

EPO Pat. Appln. No. 84102890.5 discloses copolymers of maleic acid and an adduct of an oxyalkylene and allyl alcohol, and the use thereof for scale inhibition.

Japanese No. 57-084794 discloses the use of copolymers of acrylic acid and allyl polyethylene glycol as scale inhibitors.

U.S. Pat. No. 4,297,237 discloses the use of polymaleic anhydride and polyphosphates as corrosion inhibitors, and U.S. Pat. Nos. 3,810,834, 3,963,363 and 4,089,796 disclose methods of treating the water of an aqueous system with hydrolyzed polymaleic anhydride to inhibit scale formation.

U.S. Pat. Nos. 2,723,956, 3,289,734, 3,292,152, 3,578,589 and 3,715,307 relate to the use of polymaleic anhydride and copolymers thereof as scale control agents.

U.S. Pat No. 3,965,027 discloses the use of certain amine adducts of polymaleic anhydride as scale and corrosion inhibitors.

European patent application 84301450.7 discloses carboxylic acid/sulfonic acid copolymers in combination with organic phosphonates as scale inhibitors.

U.S. Pat. Nos. 4,176,059, 4,217,216, and 4,246,030 disclose the use of molybdate compositions for corrosion inhibition.

However, none of the prior art references described above in any way suggest the use of the instant polymers as scale control agents.

Many commercial waters contain alkaline earth metal cations, such as calcium, barium, magnesium, etc., and anions such as carbonate, sulfate, oxalate and/or phosphate. When the concentrations of these anions and cations are sufficiently high, their reaction products become insoluble and precipitates form until the solubility limits are no longer exceeded. These precipitates are alkaline earth metal scales. For example, when the concentrations of calcium ion and the any of the above mentioned anions are sufficient to exceed the solubility limitations of the calcium-anion reaction products, a solid phase of calcium scales will form as a precipitate.

Solubility product concentrations are exceeded for various reasons, such as evaporation of the water phase, change in pH, pressure, or temperature, and the introduction of additional ions which can form insoluble compounds with the ions already present in the solution. As these reaction products precipitate on heat transfer surfaces in contact with aqueous streams, they form scale. The scale prevents effective heat transfer, interferes with fluid flow, facilitates corrosive processes, and harbors bacteria. Scale is an expensive problem in many industrial water systems, causing delays and shut downs for cleaning and removal. Alkaline earth metal scales commonly form on the metallic surfaces of apparatuses used for thermal treatment of aqueous solutions and suspensions. By alkaline earth metal scales, we mean scales including but not limited to calcium carbonate, calcium oxalate, magnesium carbonate, calcium phosphate, calcium sulfate, and barium sulfate. These scales frequently form in the tubes of heat exchangers and on other heat exchange surfaces.

In the past, alkaline earth metal scale inhibition has been facilitated by the use of anionic polyelectrolytes such as polyacrylates, polymaleic anhydrides, copolymers of acrylates and sulfonates, and polymers of sulfonated styrenes. However, over the past few years, high pH and/or non-chromate corrosion treatment programs have become increasingly important. The use of corrosion inhibitors such as zinc salts and/or phosphates requires that an effective scale inhibitor be used to prevent the deposition of the reaction products formed when the added inhibitors combine with the ions present in the water. Also, an effective inhibitor can increase the solubility of the corrosion inhibitors, and thus improve corrosion protection.

The deposition of iron oxide on surfaces is another severe problem in industrial cooling water systems. For example, the prevention of iron oxide precipitation is essential in nuclear power plants.

In the paper industry, the formation of scales such as barium sulfate and calcium oxalate on metal surfaces causes processing problems. These scales form rough, hard, tenacious deposits which can cause reduced stock flow, formation problems and machine down time due to the generation of fiber twists and the sloughing-off of biological debris. Sub-deposit corrosion can also be a major problem due to the activity of sulfate-reducing bacteria.

Accordingly, the need exists for an inexpensive, efficient method and composition for preventing the formation of deposits on metallic surfaces in contact with water by inhibiting the formation of scales and/or by dispersing scale-forming compounds.

The instant inventors have discovered a method for controlling scale deposition and/or dispersing scale-forming compounds in aqueous systems using maleic acid/quaternary ammonium-type polymers. While such polymers alone are effective inhibitors, other common scale and/or corrosion inhibitors may enhance their performance under certain conditions.

The instant polymers are especially effective agents for controlling calcium scales, particularly calcium oxalate.

DETAILED DESCRIPTION OF THE INVENTION

The instant invention is directed to a method for controlling scale deposition in an aqueous system comprising adding to the system being treated an effective amount of a water-soluble polymer which comprises (a) an ethylenically unsaturated dibasic carboxylic acid or anhydride, preferably maleic acid or anhydride (MA), and (b) at least one quaternary dialkyldiallyl ammonium monomer, preferably dimethyldiallyl ammonium chloride (DMDAAC) or a homologue thereof, wherein the mole ratio of (a):(b) ranges from about 1:50 to about 5:1, preferably from about 1:10 to about 3:1, most preferably from about 1:2 to about 3:1. Water soluble salts of such polymers can also be used.

Any ethylenically unsaturated dibasic carboxylic acid or anhydride can be used as monomer (a). For example, maleic acid or itaconic acid or their anhydrides can be used. Maleic acid and maleic anhydride are preferred.

The maleic anhydride/quaternary ammonium-type polymers of the instant invention may be prepared by photopolymerization or by solution polymerization techniques, preferably by solution polymerization using a persulfate-type initiator. Since the maleic anhydride groups may be hydrolyzed very readily for example, by heating with water or by neutralizing with alkali, to form free carboxylic acid groups and/or carboxylate salts with possibly some residual anhydride groups, the term "maleic anhydride" as used in this specification includes the groups formed by the hydrolysis of maleic anhydride groups. For this reason, "maleic acid" and "maleic anhydride" are used interchangeably.

The instant polymers are prepared by polymerizing at least one ethylenically unsaturated dibasic carboxylic acid or anhydride, preferably maleic acid or anhydride, in combination with at least one quaternary dialkyldiallyl ammonium monomer (monomer b). Any water-soluble dialkyldiallyl ammonium monomer can be used. The preferred monomers are those wherein the alkyl groups, which may be the same or different, are selected from the group consisting of $C_1$-$C_{10}$ alkyls. The most preferred quaternary ammonium dialkyldiallyl ammonium monomers are dimethyldiallyl ammonium chloride (DMDAAC), diethyldiallyl ammonium chloride (DEDAAC), dimethyldiallyl ammonium bromide (DMDAAB) and diethyldiallyl ammonium bromide (DEDAAB). The corresponding iodine salts can also be used.

Other quaternary ammonium salts of diallylamine derivatives, including but not limited to those disclosed in the '693 patent, can also be used as monomers in the instant process. A preferred monomer is diallyl methylamine. The quaternary ammonium salts of diallylamine derivatives disclosed in the '693 patent are hereby incorporated into this specification by reference.

The mole ratio of the acid or anhydride to the quaternary dialkyldiallyl ammonium monomer in the monomer mix may range from about 1:50 to about 5:1, preferably from about 1:10 to about 3:1 and most preferably from about 1:2 to about 3:1. The monomer mix is an aqueous solution or slurry comprising the monomers and water.

An effective amount of an instant polymer should be added to the aqueous system being treated. As used herein, the term "effective amount" is that amount of polymer necessary to control scale deposition in the system being treated. Generally, the effective amount will range from about 0.1 to about 200 ppm, on an active basis, based on the total weight of the aqueous system being treated, preferably from about 1 to about 200 ppm.

As used herein, the term "controlling scale deposition" is meant to include scale inhibition, threshold precipitation inhibition, stabilization, dispersion, solubilization, and/or particle size reduction of scales, especially alkaline earth metal, iron and zinc scales. Clearly, the instant additives are threshold precipitation inhibitors, but they also stabilize, disperse and solubilize scale forming compounds, such as iron oxide.

Thus, the inventors have discovered that the instant polymers, alone or in combination with other scale and/or corrosion inhibitors, inhibit, minimize or prevent scaling, even under severe operating conditions, and intend that the instant specification describe this discovery, without attempting to describe the specific mechanism by which scale deposition is prevented or inhibited.

The term "aqueous system", as used herein, is meant to include any type of system containing water, including, but not limited to, cooling water systems, boiler water systems, desalination systems, gas scrubber water systems, blast furnace water systems, reverse osmosis systems, evaporator systems, paper manufacturing systems, mining systems and the like.

The use of a maleic anhydride/quaternary ammonium-type polymer is critical to the instant method. Such polymers inhibit and/or prevent scale deposition, even under severe saturation and/or temperature conditions, and are generally efficient up to a pH of approximately 9.0, preferably up to approximately 8.5, though exceptions may exist.

Also, other monomers may be added to the monomer mix and polymerized with the acid/anhydride and quaternary ammonium monomers to produce polymers having additional moieties. Examples of such monomers include acrylic acid, acrylamide, sodium allyl sulfonate, allylamine, diallylamine and similar unsaturated vinyl/allyl compounds.

Chain transfer agents may also be added to the monomer mix to produce lower molecular weight polymers. Examples of such chain transfer agents include 2-propanol, formic acid and thioglycolic acid.

The instant polymers may be added to the system being treated by any convenient means. A preferred method of addition is via makeup water streams.

Additionally, other conventional water treatment agents, including but not limited to corrosion inhibitors such as zinc salts, orthophosphate sources and triazoles, can be used with the instant polymers.

EXAMPLES

Polymer Preparation

The polymers of the examples were produced by mixing maleic anhydride and dimethyldiallyl ammonium chloride in deionized water at the ratios indicated in Table I. The pH of the monomer mix was adjusted to 6 using sodium carbonate or sodium hydroxide, as indicated. Sodium persulfate was used as the initiator at a ratio of 6.3–6.5 mole % based on total monomers. The initiator solution was fed into the monomer mix over four hours at a temperature of 100° C. The results are shown as Table I.

TABLE I

| Example | MA/DMDAAC[a] Mole Ratio | MA/DMDAAC[a] Wt. Ratio | Initial Monomer Conc. (%) | Neutralizing Agent | pH | Temp. (°C.) | Type | Mole % Initiator | Conversion (%) MA | Conversion (%) DMDAAC | Conversion (%) Overall | Molecular[b] Weight |
|---|---|---|---|---|---|---|---|---|---|---|---|---|
| 1 | 1/1 | 42/58 | 40 | Na$_2$CO$_3$ | 6.0 | 100 | NAPS | 6.4 | 100 | 97 | 99 | 1,073 |
| 2 | 2/1 | 59/41 | 40 | Na$_2$CO$_3$ | 6.0 | 100 | NAPS | 6.4 | 77 | 85 | 80 | 1,492 |
| 3 | 2.5/1 | 64/36 | 40 | Na$_2$CO$_3$ | 6.0 | 100 | NAPS | 6.4 | 78 | 70 | 76 | 4,438 |
| 4 | 3/1 | 68/32 | 40 | Na$_2$CO$_3$ | 6.0 | 100 | NAPS | 6.4 | 83 | 74 | 81 | — |
| 5 | 2/1 | 59/41 | 40 | Na$_2$CO$_3$ | 6.0 | 100 | NAPS | 9.4 | 96 | 94 | 95 | — |
| 6 | 2/1 | 59/41 | 40 | NaOH | 6.0 | 100 | NAPS | 5.4 | 91 | 88 | 90 | — |

TABLE I-continued

| Example | MA/DMDAAC[a] Mole Ratio | MA/DMDAAC[a] Wt. Ratio | Initial Monomer Conc. (%) | Neutralizing Agent | pH | Temp. (°C.) | Type | Mole % Initiator | Conversion (%) MA | Conversion (%) DMDAAC | Conversion (%) Overall | Molecular[b] Weight |
|---|---|---|---|---|---|---|---|---|---|---|---|---|
| 7 | 1/1 | 42/58 | 40 | — | 1.0 | 105 | NAPS[c] | 4.2 | 83 | 96 | 90 | — |
| 8 | 2/1 | 59/41 | 38 | — | 1.0 | 101 | NAPS | 4.1 | 68 | 93 | 76 | 2,046 |
| 9 | 2/1 | 59/41 | 41 | Na$_2$CO$_3$ | 6.0 | 100 | V-50[d] | 3.6 | 59 | 60 | 60 | — |

[a]MA: maleic acid, hydrolyzed from maleic anhydride
DMDAAC: dimethyldiallyl ammonium chloride
[b]Molecular weight: weight average molecular weight determined by gel permeation chromatography using polyDMDAAC as a standard
[c]NAPS: sodium persulfate
[d]V-50: 2,2-azobis (2-amidinopropane) hydrochloride

Test Methods

The test methods used to evaluate the ability of the instant polymers to prevent Ca/PO$_4$, CaCO$_3$, CaSO$_4$, BaSO$_4$, CaC$_2$O$_4$, Fe$_x$O$_y$, Zn(OH)$_2$ and Zn/PO$_4$ scale formation and deposition in aqueous systems are described in the following sections. The results are shown in Table II and Table III.

Method 1
Calcium Phosphate Scale Inhibition Test:

Calcium phosphate scale inhibition was tested using stoppered flasks containing 9 ppm PO$_4^{-3}$ and 200 ppm Ca$^{+2}$ and treated with two levels of inhibitor at a pH of 8.5 (buffered by bicarbonate/ carbonate). The flasks were incubated at 60° C. for 24 hours. An aliquot of the solution was removed from the flask and tested for PO$_4^{-3}$ concentration. The percent inhibition was determined by the following equation:

$$\frac{\text{ppm PO}_4^{3-} \text{ in treated solution after 24 hours} - \text{ppm PO}_4^{3-} \text{ in untreated solution after 24 hours}}{9.0 - \text{ppm PO}_4^{3-} \text{ in untreated solution after 24 hours}} \times 100 = \% \text{ inhibition}$$

Method 2
Calcium Carbonate Scale Inhibition Test:

Calcium carbonate scale inhibition was tested at pH 8.0 using stoppered flasks containing 200 ppm Ca$^{+2}$ and 600 ppm HCO$_3^-$. To a flask containing distilled water, HCO$_3^-$, inhibitor, and Ca$^{+2}$ were added in that order. After mixing by swirling, the solution pH was measured and adjusted to pH 8.0, if necessary. The flask was stoppered and incubated at 60° C. for 24 hours. An aliquot of the solution was removed from the flask, filtered and titrated for calcium content to determine percent inhibition.

Method 3
Calcium Sulfate Scale Inhibition Test:

Calcium sulfate scale inhibition was tested at pH 7.0 using stoppered flasks containing 4800 ppm SO$_4^{2-}$ and 2000 ppm Ca$^{2+}$, added in that order. After mixing by swirling, the solution pH was measured and adjust to pH 7.0, if necessary. The flask was stoppered and incubated at 60° C. for 24 hours. An aliquot of the solution was removed from the flask, filtered, and titrated for calcium content to determine percent inhibition.

Method 4
Calcium Oxalate Scale Inhibition:

Calcium oxalate scale inhibition was tested at pH 6 using stoppered flasks containing 20 ppm Ca$^{+2}$, 110 ppm oxalate, 2000 ppm Na$^+$ and 2000 ppm SO$_4^{2-}$.

To a flask containing distilled water, Na$^+$, SO$_4^{2-}$, inhibitor and oxalate were added in that order. After swirling to mix, the solution pH was measured and adjusted to pH 6, if necessary. A calcium solution was then added to the flask. The flask was stoppered and incubated at 65° C. for 24 hours. An aliquot of the solution was removed from the flask, filtered, and titrated for calcium content to determine percent inhibition.

Method 5
Barium Sulfate Scale Inhibition Test:

Barium sulfate scale inhibition was tested at pH 6 using stoppered flasks containing 69 ppm Ba$^{2+}$, 48 ppm SO$_4^{2-}$, 23 ppm Na$^+$, 36 ppm Cl$^-$ and 1 ppm Al$^{3+}$. To a flask containing distilled water, SO$_4^{2-}$, inhibitor, and Al$^{3+}$ were added in that order. After swirling to mix, the solution pH was measured and adjusted to pH 6, if necessary. A barium solution was then added to the flask. The flask was stoppered and incubated at room temperature for 24 hours. An aliquot of the solution was removed from the flask, filtered, and titrated for barium content to determine percent inhibition.

Method 6
Zinc Hydroxide Scale Inhibition Test:

Zinc hydroxide scale inhibition was tested at pH 8.5 using stoppered flasks containing 160 ppm Ca$^{2+}$, 204 ppm SO$_4^{2-}$, and 5 ppm Zn$^{2+}$. To a flask containing distilled water, inhibitor, SO$_4^{-2}$, Zn$^{+2}$ and Ca$^{+2}$ were added in that order. The pH of the solution was measured and adjusted to pH 8.5 with dilute NaOH, if necessary. The flask was stoppered and incubated at 60° C. for 24 hours. An aliquot of this solution was then removed, filtered, acidified with concentrated HCl, and analyzed for zinc content using atomic absorption spectroscopy.

Method 7
Zinc Phosphate Scale Inhibition Test:

Zinc phosphate scale inhibition was tested at pH 8.0 using stoppered flasks containing distilled water and 68 ppm Ca$^{2+}$, 26 ppm Mg$^{2+}$, 106 ppm SO$_4^{2-}$, 8 ppm SiO$_3^{2-}$, 5 ppm Zn$^{2+}$, and 10 ppm PO$_4^{3-}$. SiO$_3^{2-}$ was initially added to a flask containing distilled water. The solution pH was adjusted to pH 6 with concentrated HCl. Then Ca$^{2+}$, Mg$^{2+}$(as MgSO$_4 \cdot$ 7H$_2$O), inhibitor, PO$_4^{3-}$ and Zn$^{+2}$ were added in that order with stirring. The pH of the solution was measured and adjusted to pH 8.0 with dilute NaOH if necessary. The flask was stoppered and incubated at 50° C. for 24 hours. An aliquot of this solution was then removed, filtered, acidified with concentrated HCl, and analyzed for zinc content using atomic absorption spectroscopy.

Method 8

Iron Oxide Dispersion Test

Preparation of Amorphous Iron Oxide:

Fresh amorphous iron oxide was prepared by the addition of NaOH to an $FeCl_3$ solution at an OH:FE ratio of 4:1. This solution was stored for approximately 19 hours at 40° C. The resulting iron oxide particle size was found to be approximately 10 nm. The amorphous iron oxide thus formed was diluted to give the desired level of iron oxide, usually 5 mg/1.

Dispersion Testing:

Iron oxide dispersion was tested at pH 8.0-9.0 using stoppered flasks containing 5 mg/L $Fe^{3+}$, 63 mg/L $CO_3^{2-}$, and 50 mg/L $Ca^{2+}$. To a flask containing 46 ml of distilled water and dispersant, 2 ml of $CO_3^{2-}$ solution, 50 ml of 10 mg/l amorphous iron oxide stock solution, and 2 ml of $Ca^{+2}$ solution were added. The flask was stoppered and incubated at 55° C. for 24 hours. An aliquot of this solution was carefully removed, so as not to disturb the contents, and % transmission at 415 nm was measured using a spectrophotometer. Iron oxide dispersion was calculated as follows:

% Dispersion =

$$\frac{\text{Blank \% } T @ 24 \text{ hrs.} - \text{Sample \% } T @ 24 \text{ hrs.}}{\text{Blank \% } T @ 24 \text{ hrs.} - \text{Blank \% } T @ 0 \text{ hrs.}} \times 100$$

TABLE III

Scale Inhibition Test Results for MA/DMDAAC Copolymers Paper Industry Applications

| MA/DMDAAC mole ratio | ph 6 $CaC_2O_4$ | | pH 6 $BaSO_4$ | |
| --- | --- | --- | --- | --- |
| | 1 ppm | 2 ppm | 15 ppm | 18 ppm |
| 1/1 | 14 | 26 | 31 | 31 |
| 2/1 | 50 | 100 | 76 | 95 |
| 2.5/1 | 96 | 98 | 94 | 94 |
| 3/1 | 100 | 100 | 91 | 91 |

What we claim is:

1. A method for controlling scale deposition, including deposition of calcium oxalate, barium sulfate, or zinc hydroxide scale, in an aqueous system, which method consists essentially of adding to said system an effective amount of a polymer comprising:
   (a) maleic acid or anhydride; and (b) at least one quaternary dimethyldiallyl ammonium monomer; wherein the mole ratio of (a):(b) ranges from about 1:2 to about 3:1 and wherein said polymer has a molecular weight of from about 500 to about 10,000.

2. The method of claim 1, wherein said polymer is added at a dosage of from about 0.1 to about 200 ppm.

3. The method of claim 2, wherein calcium oxalate scale deposition is controlled.

4. The method of claim 2, wherein barium sulfate scale deposition is controlled.

5. The method of claim 2, wherein zinc hydroxide scale deposition is controlled.

* * * * *

TABLE II

Scale Inhibition Test Results for MA/DMDAAC Copolymers Cooling Water Applications

| Example | MA/DMDAAC mole ratio | pH 8.5; Ca/PO$_4$ | | pH 8; CaCO$_3$ | | | pH 7; CaSO$_4$ | | | Fe$_x$O$_y$ Dispersion | | | pH 8.5 Zn(OH)$_2$ | | | pH 8; Zn/PO$_4$ | | |
| --- | --- | --- | --- | --- | --- | --- | --- | --- | --- | --- | --- | --- | --- | --- | --- | --- | --- | --- |
| | | 8 ppm | 10 ppm | 1 ppm | 2 ppm | 4 ppm | 2 ppm | 4 ppm | 6 ppm | 5 ppm | 7.5 ppm | 10 ppm | 2 ppm | 5 ppm | 10 ppm | 10 ppm | 15 ppm | 20 ppm |
| 1 | 1/1 | 91 | 90 | 53 | 55 | 66 | 19 | 44 | 83 | 100 | 98 | 99 | 69 | 92 | 94 | 81 | 77 | 78 |
| 2 | 2/1 | 80 | 87 | 53 | 70 | 96 | 21 | 62 | 100 | 15 | 103 | 100 | 88 | 90 | 96 | 86 | 89 | 91 |
| 3 | 2.5/1 | — | — | 70 | 79 | 98 | 22 | 98 | 100 | 3 | 67 | 96 | — | — | — | — | — | — |
| 4 | 3/1 | — | — | 74 | 83 | 87 | 19 | 42 | 69 | 0 | 1 | 4 | 76 | 74 | 74 | 20 | 22 | 33 |